(12) United States Patent
Southwell

(10) Patent No.: US 7,406,581 B2
(45) Date of Patent: Jul. 29, 2008

(54) SPECULATIVE INSTRUCTION LOAD CONTROL

(75) Inventor: Trevor Southwell, Bristol (GB)

(73) Assignee: STMicroelectronics Limited, Bristol (GB)

(*) Notice: Subject to any disclaimer, the term of this patent is extended or adjusted under 35 U.S.C. 154(b) by 212 days.

(21) Appl. No.: 10/830,717

(22) Filed: Apr. 23, 2004

(65) Prior Publication Data
US 2005/0013183 A1 Jan. 20, 2005

(30) Foreign Application Priority Data
Apr. 24, 2003 (EP) .................. 03252602

(51) Int. Cl.
*G06F 12/14* (2006.01)
(52) U.S. Cl. .................. 711/209; 711/213; 710/3
(58) Field of Classification Search ........... 711/163, 711/202–209, 213; 710/3
See application file for complete search history.

(56) References Cited

U.S. PATENT DOCUMENTS

| 4,653,050 | A | * | 3/1987 | Vaillancourt | 714/8 |
| 4,763,244 | A | | 8/1988 | Moyer et al. | |
| 5,680,565 | A | | 10/1997 | Glew et al. | |
| 5,864,692 | A | * | 1/1999 | Faraboschi et al. | 712/216 |
| 6,519,690 | B1 | | 2/2003 | Quimby | |
| 6,629,187 | B1 | * | 9/2003 | Krueger et al. | 711/3 |
| 6,711,671 | B1 | * | 3/2004 | Undy et al. | 712/225 |
| 2002/0133661 | A1 | * | 9/2002 | Suzuki et al. | 710/308 |
| 2003/0204702 | A1 | * | 10/2003 | Lomax et al. | 711/207 |

FOREIGN PATENT DOCUMENTS

| EP | 0 653 709 A1 | 5/1995 |
| WO | WO 95/32460 | 11/1995 |
| WO | WO 98/27485 | 6/1998 |

OTHER PUBLICATIONS

John L Hennessy and David A. Patterson, Computer Orgainzation and Design, 1998, Morgan Kaufmann Publishers, Inc., second edition, pp. 580-582.*

I/O Address Space Width, http://www.pcguide.com/ref/mbsys/res/ioWidth-c.html (retreived from internet Mar. 1, 2007), Apr. 17, 2001, Charles M. Kozierok.*

* cited by examiner

*Primary Examiner*—Donald Sparks
*Assistant Examiner*—Jared I Rutz

(57) ABSTRACT

A method and system for validating speculative load operations. The system identifies speculative load operations that might be executed in a code sequence and after translating the virtual address of the speculative load to a physical address, a speculative load control unit is used to define a plurality of memory regions and has means for checking whether the physical addresses lie within at least one of said defined memory regions. In this way, the control unit allows the mapping of large physical page size to RAM devices and the extra address space is filtered off by the control unit so that speculative loads are not carried out in unknown regions.

13 Claims, 5 Drawing Sheets

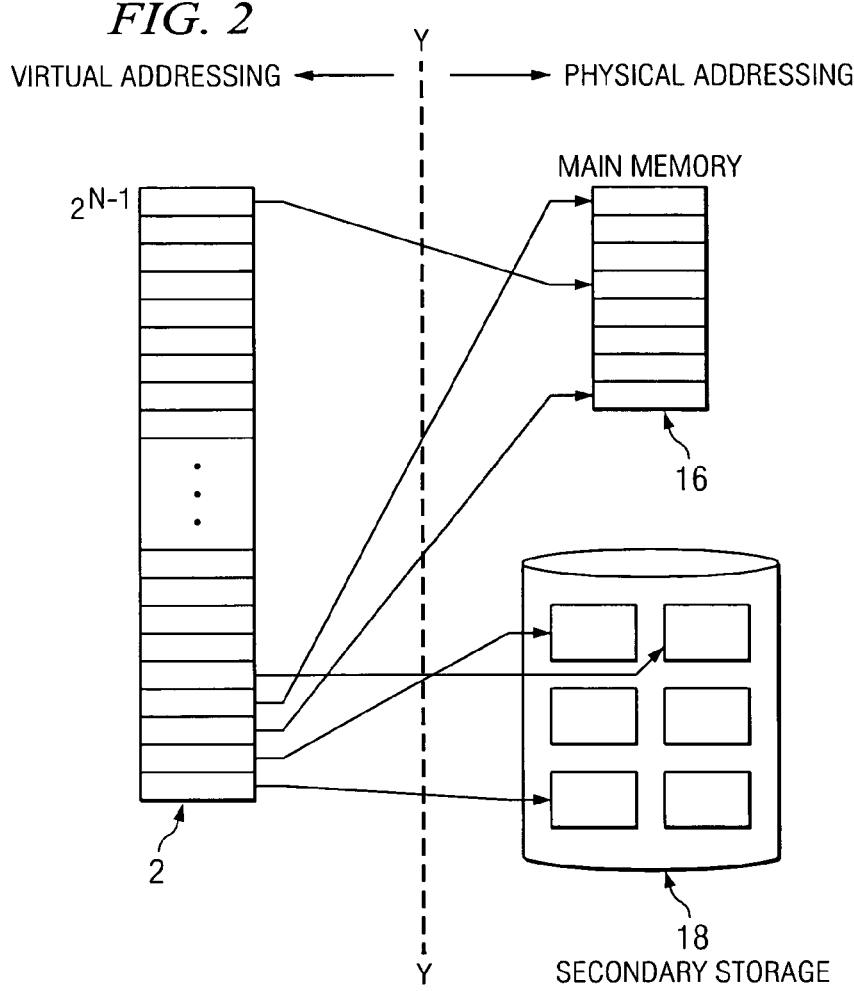

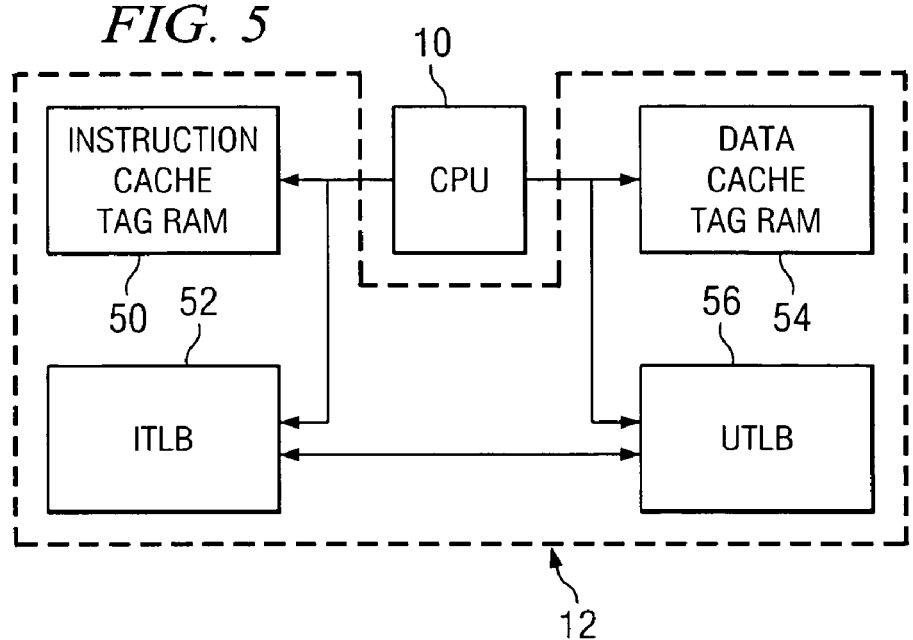
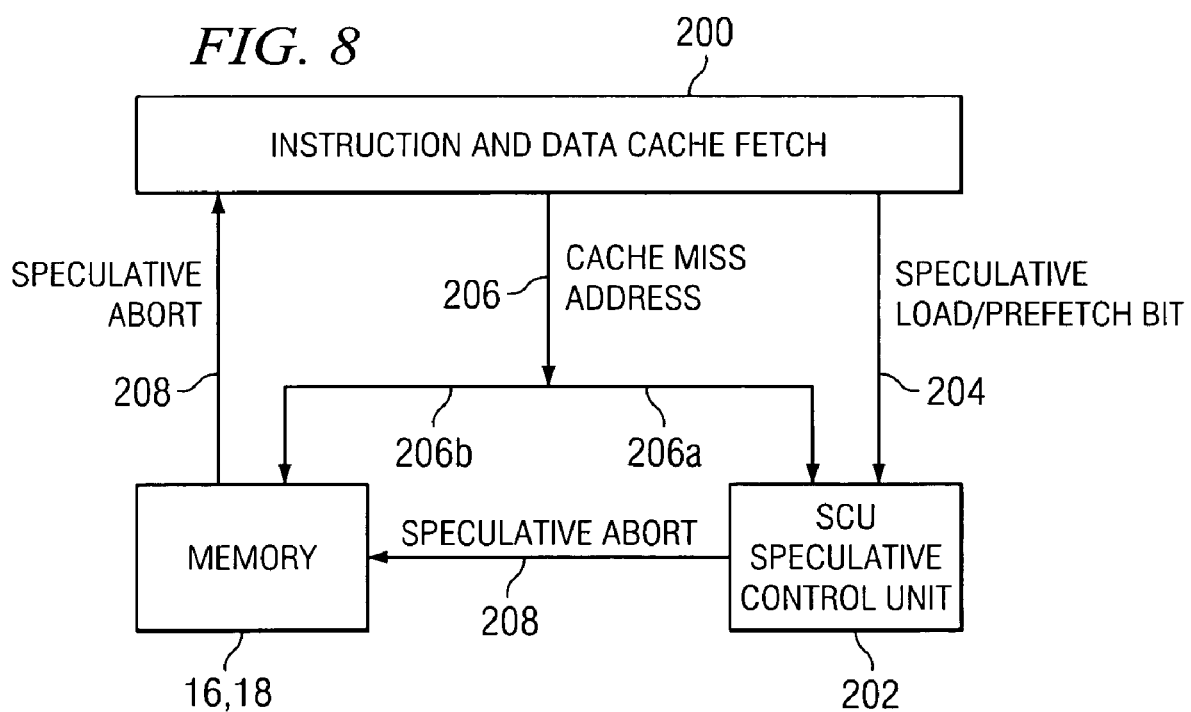

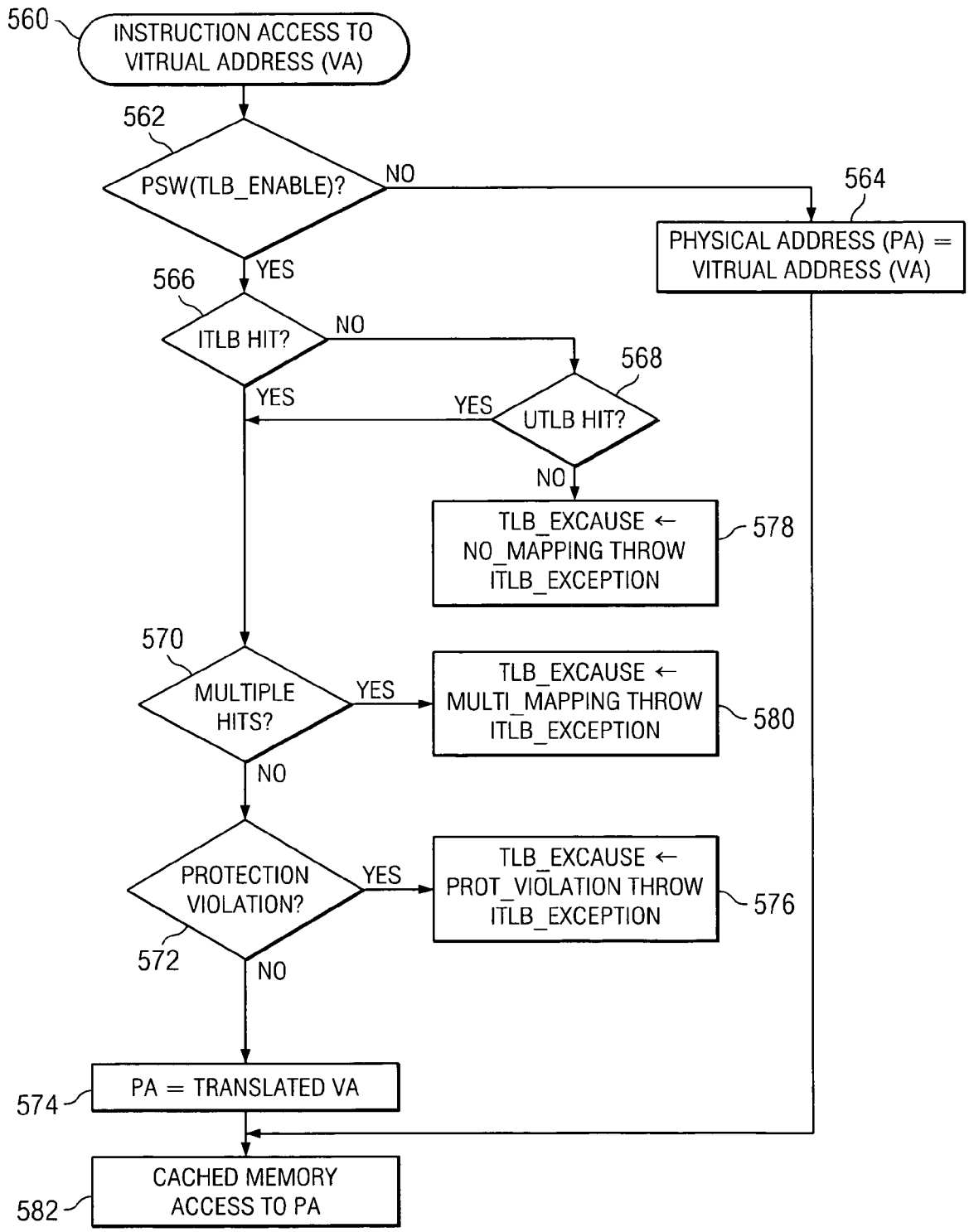

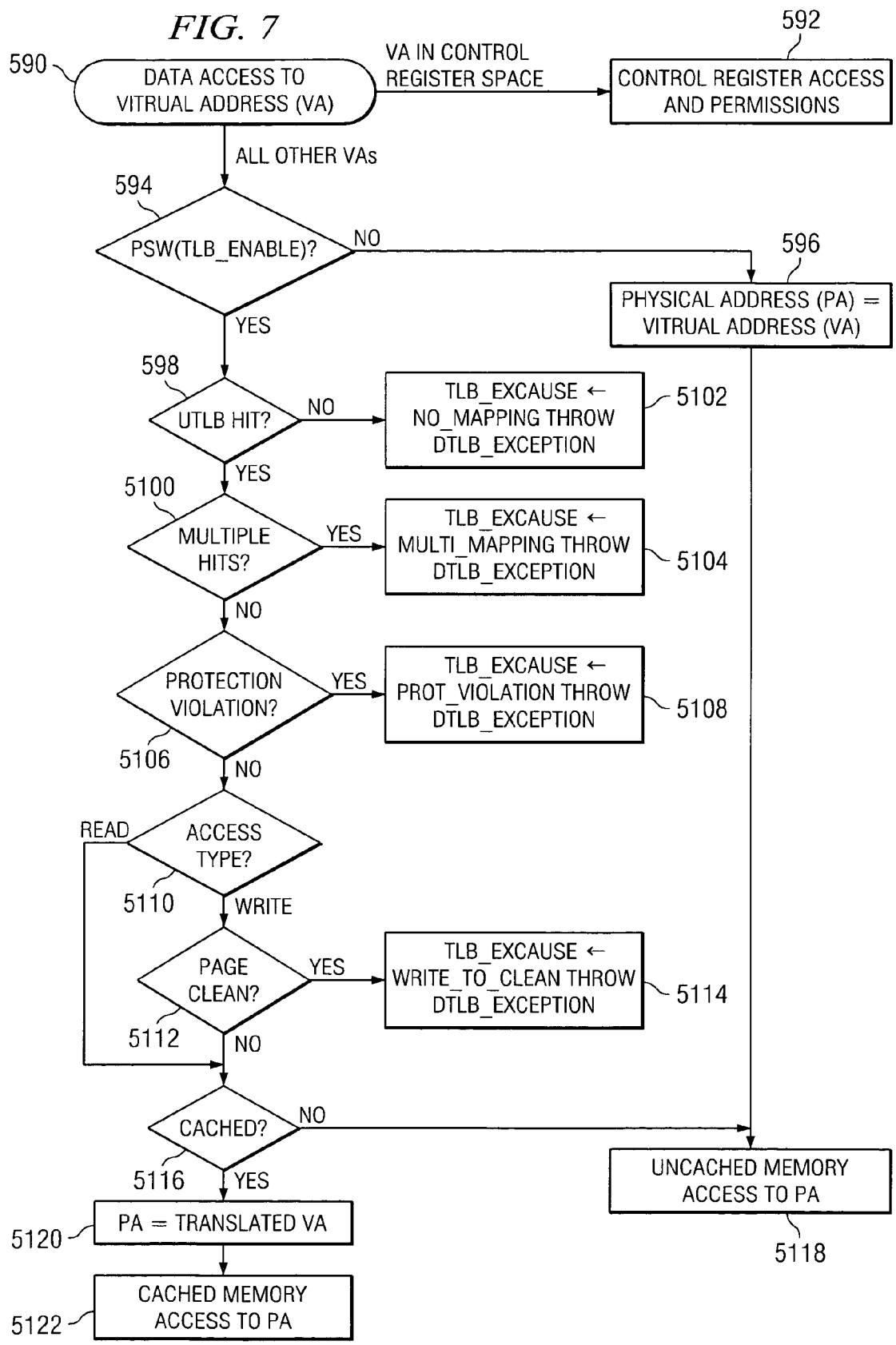

US 7,406,581 B2

SPECULATIVE INSTRUCTION LOAD CONTROL

TECHNICAL FIELD OF THE INVENTION

The present invention is concerned with memory addressing and more particularly with the validation of memory addresses for speculative load operations.

BACKGROUND OF THE INVENTION

FIG. 1 illustrates a conceptual block diagram of a PRIOR ART a processor with a typical memory architecture. In particular, FIG. 1 shows a MMU (Memory Management Unit) 12 which provides the interface between memory and a processor 10. The memory is shown below the horizontal dotted line XX as, for example, comprising a cache 14, a main memory 16 and secondary memory 18. Also, on the diagram there are two vertical arrows 20, 22. The vertical arrow 22 points upwards and indicates that as one moves up the memory hierarchy, the access speeds of the respective memories increases. That is, the CPU is able to access the cache unit 14 the quickest (i.e. with the least delay). This is normally the case because each of these memories is typically constructed from different electronic components. For example, cache memory 14 is typically SRAM (Static Random Access Memory) memory, main memory 16 is typically DRAM (Dynamic) memory and secondary memory 18 is usually provided by disc storage.

The purpose of such a memory is to optimise the execution of a program to be run on the processor 10. The system will try to organise itself, using for example well-known LRU (Least Recently Used) replacement algorithms, so that the code and data to be accessed most frequently is stored in the memory areas having faster access speeds. The code or data used most often will be stored in the cache unit, while the code or data to be accessed least often (or perhaps not at all) is stored in secondary memory 18.

At least one purpose of the MMU 12 is to translate from virtual addresses issued by the processor 10 into physical addresses which correspond to actual memory locations of data or code stored in one of the physical memory areas. Virtual addressing advantageously allows a logical contiguous address space to be created for the processor, but each logical or virtual memory allocation is actually represented physically by particular physical memory addresses, which need not be contiguous.

FIG. 2 illustrates a conceptual block diagram of a PRIOR ART mapping of contiguous virtual addresses to non-contiguous physical addresses within a general system employing virtual addressing. FIG. 2 shows a virtual memory 2 having a number of logical contiguous memory addresses running from address 0 to the address $2^{n-1}$ where n is the number of bits used. For example in a 32-bit virtual addressing system, the size of virtual memory can be 4 GB (i.e. $2^{32}$). The virtual memory locations need to point to actual physical memory locations where physical data or code, to be accessed, is stored. The dotted vertical line YY shows the virtual addressing system on the left hand side in which each virtual address corresponds to an actual physical memory address shown on the right hand side of the dotted line YY.

FIG. 2 shows for example, that the physical address space comprises main memory 16 and secondary memory 18. FIG. 2 also shows that virtual addresses can be referred to in a contiguous manner, whereas the actual physical locations to be accessed are non-contiguous and can also be found in different physical devices of the physical memory. Therefore, in a virtual addressing system, the MMU 12 is able to map virtual addresses into physical addresses and to maintain a database for the storage of such mappings.

A technique often used in computing systems of this type is "paging", in which the physical memory is divided into fixed sized blocks known as pages. Although the virtual memory is also divided into pages which are mapped to corresponding physical page addresses, it is the selection of the page size of the physical address which is important to the designer of the system as will be explained later.

FIG. 3 illustrates a PRIOR ART example of mapping a virtual page address to a physical page address. FIG. 3 should be referred to in combination with FIG. 1 in that the processor 10 issues a virtual address 30 which is translated by the MMU 12 into a physical address 32. For example, a 32-bit virtual address 30 is used which comprises a VPN (Virtual Page Number) portion 34 and a PO (Page Offset) portion 36. The PO 36 is merely an index into the identified page for selecting a particular memory location and in the example is shown as taking bits 0 to 11 of the virtual address. The VPN takes up the reminder of the 32-bit address by taking bits 12 to 31. The MMU 12 has circuitry for translating the VPN portion 34 of the virtual address into a PPN (Physical Page Number) portion 39 of the physical address. Typically, the PO portion 38 of the physical address 32 is not translated and retains the same value as the PO portion 36 of the virtual address 30.

The physical address 32 is shown as having bits 0 to k where $k \leq 31$. The number of PPN's (and hence the size of k) will depend on the size of the selected page. For a small page size of 4 Kb there are potentially 1024 PPN's (or physical page addresses to choose from) in a 4 GB system (i.e. where n=32). In this case, k=31 since 20 bits are needed to represent 1024 PPN's (i.e. $2^{20}$=1024). However, if a large page size of 256 MB is chosen, then there are potentially only 16 PPN's in such a system. In this case, k=15 since only 4 bits are needed to represent 16 PPN's.

FIG. 4 illustrates a PRIOR ART page mapping structure of a TLB (Translation Look-aside Buffer) 40. The basic structure of TLB 40 is used by the MMU 12 for mapping the VPN 34 into the PPN 39. It should be appreciated that if the page size of the physical memory is selected to be small, there will be a larger number of PPN's than if the page size were chosen to be large. Therefore, the selection of a page size is a trade-off depending on what is required from the system and the designer's requirements.

The translation look-aside buffer can be implemented using a small area of associative memory within a processor. A data structure for achieving this is a page-table as shown in FIG. 4.

The translations can be too large to store efficiently on the processor. Instead, it is preferable to store only a few elements of the translation in the TLB so that the processor can access the TLB quickly. It is desirable that the TLB is not too big and does not have too many entries so that precious processing overhead is not spent searching through a large number of entries.

Speculative load operations are the same as normal load operations, except speculative loads can be executed out of sequence and will return the same data as normal loads except that when a normal load would cause an exception to be raised, a speculative load will instead return an invalid number.

The unpleasant property of speculative loads is that effectively they can be considered as an instruction that can generate a read from anywhere in the address space. This is problematic, because either i) there is no device or physical memory mapped at that address resulting in a bus error or ii)

a device or memory area that is mapped is read sensitive so that the speculative load will destroy the device state. Either of these scenarios is potentially disastrous.

One solution uses a valid bit 33 to overcome this problem, in that when this bit was set speculative loads from this page address always returned a zero. If a small page size (for example 8 KB) is chosen then for a 64-entry TLB only 512 KB of physical memory will be mapped. Thus, potentially in a 4 GB virtual address space there will be many areas of the physical memory which are not mapped and therefore many TLB misses. A TLB miss is termed a "page fault" and will be serviced in the normal way.

Therefore, many modern systems prefer large page sizes in that there are only a limited number of PPN's to be mapped and therefore the number of TLB entries is reduced along with the processing overhead needed to access the corresponding entry. However, this approach has serious disadvantages for big page sizes both for use in a small real-time operating system and a large multitasking operating system, for example Linux.

In the case of a small real-time operating system, it is highly desirable to avoid the overhead of having to service page faults, which means one wants to use big pages. However, consider a 16 MB RAM, if the system uses a page size larger than 16 MB, the system loses its fine grain control and everything above 16 MB will be a hole, where speculative loads could cause a problem because there is no RAM there to read from. This disadvantage become even more apparent for a RAM size, which is not a power of 2, for example 112 MB.

In the case of a large multitasking operating system such as Linux, the problem is essentially the same. That is, the kernel of the operating system in this case likes to see all of the RAM without having to take page faults. So ideally all of RAM is mapped at a high virtual address page with a single TLB entry which is fixed (i.e. it will never be replaced). However, again the same disadvantage is that for a large page size it will not be able to achieve the finer grain control needed to identify whether a speculative load is valid.

SUMMARY OF THE INVENTION

To address the above-discussed deficiencies of the prior art, it is an aim of the present invention to provide a method and system for validating speculative load operations while overcoming the problems of large page sizes.

According to a first aspect of the present invention there is provided a computer system having a memory map for addressing a plurality of selectively available memory mapped devices, and a memory access system for accessing said memory mapped devices, when available, the memory access system having an input for receiving a memory address, means for defining a plurality of valid memory regions covering a memory space within which there exists at least one of said available memory mapped devices and means for checking whether the received memory address lies in at least one of the defined memory regions, whereby if it does, the address is validated for access, and if it does not, an error is returned.

According to another aspect of the present invention there is provided a method for validating a memory address in a computer system having a memory map for addressing a plurality of selectively available memory mapped devices, and a memory access system for accessing said memory mapped devices, when available, the method comprising: defining a plurality of valid memory regions covering a memory space within which there exists at least one of said available memory mapped devices; receiving said memory address; and checking whether the received memory address lies within at least one of the defined memory regions, whereby if it does, the address is validated for access, and if it does not, an error is returned.

According to yet another aspect of the present invention there is provided a computer system with a processor operable to issue memory access requests to a memory address space divided into memory pages of a fixed page size for addressing memory mapped devices at least one of which occupies a memory space less than said page size, the computer system comprising: filtering means for identifying which of said memory access requests correspond to a predetermined type of load operation; and a control unit comprising: an input for receiving said memory access requests; means for defining a plurality of valid memory regions covering a memory space within which there exists at least one of said available memory mapped devices; and means for checking that each memory address of the received requests lies in at least one of the defined memory regions, whereby if it does, the address is validated for access, and if it does not, an error is returned.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrase "selectively available" is used in relation to devices that are memory mapped but may suitably be physically present or absent; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "circuit" and "circuitry" may be used interchangeably and mean any device or part thereof that controls at least one operation, such a device may be implemented in hardware, firmware or software, or some combination of at least two of the same. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the present invention and to show how the same may be carried into effect, reference will now be made by way of example to the accompanying drawings, in which like reference numerals represent like parts, and in which:

FIG. 2 illustrates a conceptual block diagram of a PRIOR ART mapping of contiguous virtual addresses to non-contiguous physical addresses;

FIG. 4 illustrates a PRIOR ART page mapping structure of a translation look-aside buffer;

FIG. 5 illustrates the structure of the memory management unit according to an embodiment of the present invention;

FIG. 6 illustrates a flow diagram for dealing with memory access requests for instructions according to an embodiment of the present invention;

FIG. 7 illustrates a flow diagram for dealing with memory access requests for data according to an embodiment of the present invention; and FIG. 8 illustrates filtered speculative load addresses and a speculative load control unit for validating the addresses according to an embodiment of the present invention.

DETAILED DESCRIPTION OF THE INVENTION

FIGS. 5 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged computer system.

Figure 1:
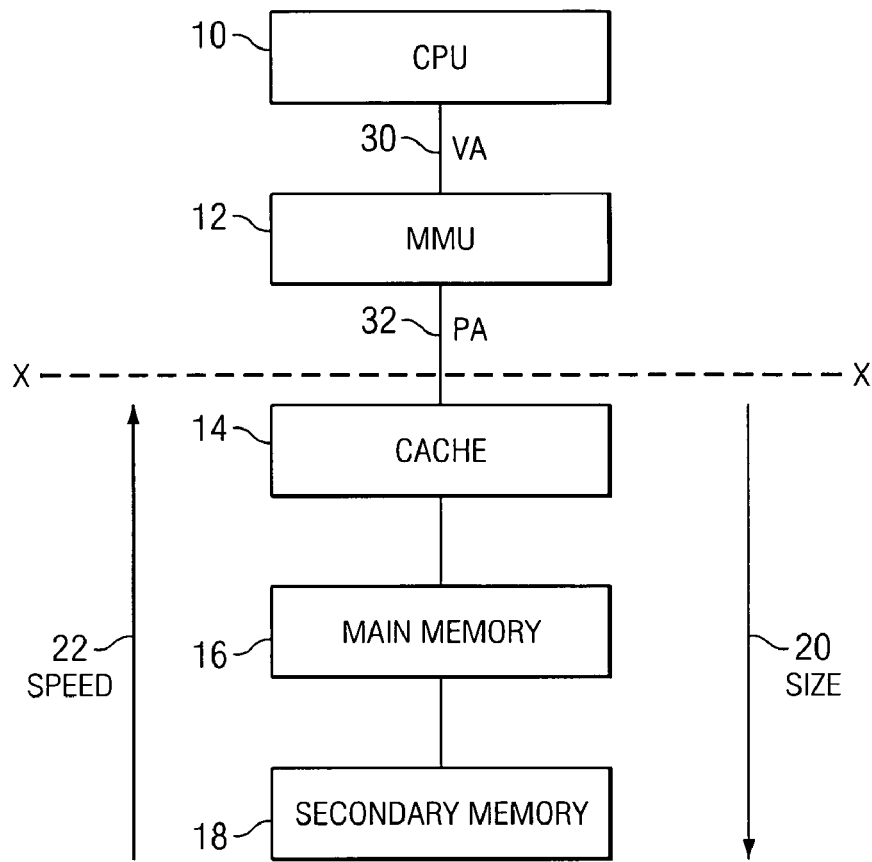
FIG. 1 illustrates a conceptual block diagram of a PRIOR ART processor arrangement for interacting with memory.
Figure 3:
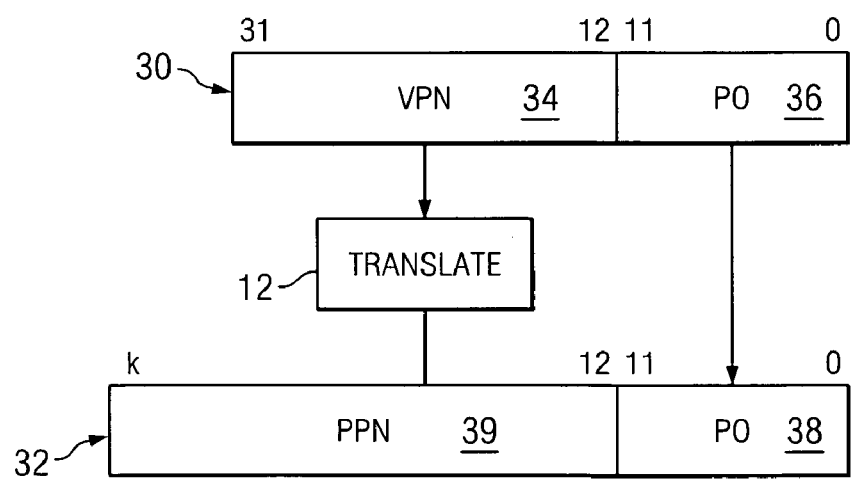
FIG. 3 illustrates a PRIOR ART example of mapping a virtual page address to a physical page address.

FIG. 5 illustrates a MMU 12 according to an embodiment of the present invention within the dotted lines. The MMU comprises two TLB's (Translation Look-aside Buffer), an Instruction TLB 52 (ITLB) and a Unified TLB 56 (UTLB), each having a corresponding cache tag RAM 50, 54. The ITLB 52 is a small (8-entry TLB) which performs instruction address translations in parallel with its associated instruction cache tag RAM 50. The UTLB 56 is a larger (64-entry) TLB which performs data address translations, and when required also performs instruction address translations, when there is an ITLB miss. The UTLB 56 also has a corresponding data cache tag RAM 54. The cache units 14 (FIG. 1) which will be accessed by the MMU are virtually indexed but physically tagged, and the cache tag RAM lookup happens in parallel with the TLB lookup.

According to a preferred embodiment of the present invention the TLB will perform mapping from virtual to physical addresses using one of the following page sizes 8 KB, 4 MB and 256 MB.

In order to operate the MMU 12, various control registers are defined and reserved in memory. A PSW (Processor Status Word) register defines a TLB_ENABLE bit for enabling the address translation mechanism, i.e. when TLB_ENABLE is set to 1. Some of the other registers are broadly defined in Table 1 below.

TABLE 1

| Control Registers | | | |
|---|---|---|---|
| Name | Offset | Access (U/S) | Comment |
| TLB_INDEX | D000 | RO/RW | Index of the TLB entry pointed to by TLB_ENTRYHI and TLB ENTRYLO. |
| TLB_ENTRYHI | D008 | RO/RW | Upper 32 bits of the current TLB entry. |
| TLB_ENTRYLO | D010 | RO/RW | Lower 32 bits of the current TLB entry. |
| TLB_PTBASE | d018 | RO/RW | Base address of current page table. |
| TLB_ASID | d020 | RO/RW | Contains 8-bit identifier for the current Process. |
| TLB_EXCAUSE | d028 | RO/RW | Cause of the TLB related exception. |
| TLB_CONTROL | d030 | RO/RW | Control bits for TLB. |
| TLB_REPLACE | d038 | RO/RW | Replacement pointer. |
| SCU_BASE0 | d040 | RO/RW | Base address of speculative load region. |
| SCU_LIMIT0 | d048 | RO/RW | Limit address of speculative load region. |

TABLE 1-continued

| Control Registers | | | |
|---|---|---|---|
| Name | Offset | Access (U/S) | Comment |
| SCU_BASE1 | d050 | RO/RW | Base address of speculative load region. |
| SCU_LIMIT1 | d058 | RO/RW | Limit address of speculative load region. |
| SCU_BASE2 | d060 | RO/RW | Base address of speculative load region. |
| SCU_LIMIT2 | d068 | RO/RW | Limit address of speculative load region. |
| SCU_BASE3 | TBD | RO/RW | Base address of speculative load region. |
| SCU_LIMIT3 | TBD | RO/RW | Limit address of speculative load region. |

The MMU 12 raises an exception to the processor when some sort of fault or violation is encountered. The reason for the exception is updated in the TLB_CAUSE control register of the MMU. That is, the possible exceptions that can be raised by the MMU are:

NO_MAPPING—The UTLB 56 does not have a mapping for the virtual address. That is, the requested page is not in either the ITLB 52 or the UTLB 56.

PROT_VIOLATION—The permissions for access to this page have been violated.

WRITE_TO_CLEAN—A page that was clean is being written to.

MULTI_MAPPING—There were multiple hits in the UTLB 56. The software managing the TLB should ensure that this does not happen.

FIG. 6 illustrates a flow diagram describing the procedure for instruction access requests according to an embodiment of the present invention. At step S60 an instruct access request is received from the processor 10 by the MMU 12. At step S62, a check is done on the PSW register to see whether the translation look-aside buffer mechanisms have been enabled. If not, then the virtual address becomes the physical address at step S64 and the physical address in the cache 14 is then accessed at step S82. If the check at step S62 is that the TLB's are enabled then at step S66 the ITLB 52 is first checked for a hit (i.e. if there exists an virtual-to-physical address mapping for the requested instruction). If there is no hit at the ITLB 52, then at step S68 the UTLB 56 is checked for a hit. If there is also not a hit in the UTLB, then at step S78 a NO_MAPPING exception is raised. If either, the ITLB or UTLB are hit then a check at step S70 is performed to see whether there are multiple hits. If yes, a MULTI_MAPPING exception is raised at step S80. If no, then a further check is performed at step S72 as to whether there is a protection violation. If yes, a PROT_VIOLATION exception is raised at step S76. If no, the virtual address is translated into the corresponding physical address (obtained from the mapping in either the ITLB or the UTLB) at step S74 and finally the relevant physical address containing the requested instruction is accessed in the cache unit 14 at step S82.

In a preferred embodiment of the present invention, instruction accesses are always cached. This can be seen in that the flow diagram always ends in the final step S82 of retrieving the cached instruction access requests. Also, instruction access requests take priority over data access requests to the UTLB 56.

FIG. 7 illustrates a flow diagram describing the procedure for data accesses which includes reading and writing data according to an embodiment of the present invention. There is a portion of the total virtual address space which is reserved for the control registers at step S92. For all other virtual addresses, the data access requests are checked at step S94 to see whether the translation circuitry in the MMU is enabled. If no, then physical addressing is used and the relevant physical address is accessed. It should be noted that step S118 describes accessing an uncached address and therefore the MMU will access either the main memory 16 or the secondary memory 18.

If the translation circuitry is enabled then the UTLB 56 is checked for a hit (i.e. whether there is a virtual-to-physical address mapping for the requested data). It should be noted that the ITLB does not need to be checked in the case of data access requests, since the ITLB only contains translations of instruction addresses. As in FIG. 6, the same exceptions can be raised, i.e. a NO_MAPPING exception at step S102, a MULTI_MAPPING exception at step S104 or a PROT_VIOLATION exception at step S108. If no exceptions are raised then at step S110 a check is done to see what type of data access is requested, i.e. either a read or write request. If it is a read data access request then go directly to the check at S116 to see whether the address is cached. On the other hand for a write data access request, a check is performed at step S112 as to whether the page is clean. If yes, a WRITE_TO_CLEAN exception is raised at step S114. If no, then the check at step S116 is performed to see whether the address is cached. If the data access request is not cached, then the MMU 12 will need to access either the main memory 16 or the secondary memory 18. If the access request is cached and there are no exceptions then at step S120 the virtual address of the data access request is translated into the corresponding physical address (from the UTLB). Finally, at step S122 the cache unit 14 is accessed at the relevant physical address containing the requested data.

Speculative Loads

For a normal load operation, for example consider the line of code:

LOADx2020, which instructs that data stored at the physical address that corresponds to the virtual address 2020 should be loaded and assigned to the variable x. For example, the MMU will attempt to translate the virtual address 2020 into a physical address 8100.

If the address to be loaded is invalid, for example a NO_MAPPING exception is raised in the MMU because the relevant TLB does not contain a mapping of this physical address, then any subsequent code is killed and the processor will not continue executing the code until the exception has been removed and the physical address to be loaded becomes valid.

A no mapping exception could be raised because the page size is too small and the TLB did not have the capacity to store that particular mapping.

However, a speculative load operation offers an improvement in that speculative loads are defined as returning the same data as normal loads except that when a normal load would cause an exception to be raised, a speculative load will instead return an invalid number. According to a preferred embodiment of the present invention, when an address to be loaded is invalid the number zero is returned indicating an exception has been raised. Moreover, for a speculative load although the condition that caused the exception is not executed, the code continues thereby increasing the overall efficiency of the system. This is illustrated by the line of code:

LOAD.Sx2020, in which although the address may be invalid, the number zero is returned to the compiler or software programmer to recognize this but the subsequent code is continued.

Consider the following simple piece of code which might exist in a pipelined processing environment:

```
If a * b > 3
    x = 1
else
    x = y
```

At the compilation level, the pseudo-code might look something like:

```
t = a * b
cond = t > 3
if cond is TRUE
    STORE x = 1
else
    LOAD    y
    NOP
    NOP
    STORE x = y
```

The "IF/ELSE" statement in the example above is common wherein the code sequence will branch depending on whether a particular condition is met (TRUE) or not met (FALSE). If the condition is TRUE (i.e. the result of the multiplication of the two numbers represented by variables a and b) and the result is greater than 3 then the value 1 is stored into the address represented by variable x. However, if the condition is FALSE then the code branches to the ELSE statement and the value stored at the address of the variable y is stored into the address represented by the variable x. It is necessary to first LOAD the value represented in the y variable address before storing this value into the x variable. Even if there exists in the TLB a valid mapping for the y variable, for the normal load operation there is a period of latency between the issuance of the LOAD operation itself and actually receiving the result (completion) of the LOAD operation. This is represented by the two NOP (No operation) instructions described above.

The efficiency of executing this code sequence can be improved in that the LOAD operation can be replaced with a speculative load operation LOAD.S wherein the y variable to be loaded is prefetched and executed out of order as shown below.

```
LOAD.S    y
t = a * b
cond = t > 3
x = cond ? 1 : y
STORE    x = y
```

Owing to the speculative nature of the load operation LOAD.S it can be executed out of order so that the potential storage operation STORE x=y is not delayed, because the value represented by y has already been speculatively loaded a few cycles earlier. The penultimate line is just shorthand for expressing that if the condition is TRUE (i.e. that the product of a and b is greater than 3) then x=1 otherwise x=y. The IF/ELSE branch is removed and the code does not need to branch since these values are at hand for the compiler (i.e. the value at the address represented the variable y has been loaded).

As described before, the known methods for validating speculative loads are disadvantageous when a large page size is selected in that the extra address space, covered by the large page size, over and above the RAM or device to be mapped is unknown to the system and potentially problematic for speculative loads.

Therefore, a speculative load control unit SCU 202 according to a preferred embodiment of the present invention is able to solve these problems by performing a check to see if the requested speculative load address is valid. If the speculative load address is valid then the requested memory address to be loaded is fetched from memory 14,16. Alternatively, if the speculative address is not valid then, as is the case with invalidated speculative loads describes above, a number is returned (for example zero) indicating that the address is not valid.

The advantage of the SCU is that one can map a large page (for example 256 MB) on top of a physical RAM or device and the extra address space is filtered off by the SCU, which is not seen by the memory system.

FIG. 8 illustrates block 200 that represents functionality for prefetching instructions or data memory access requests. From a conceptual viewpoint, the block 200 is downstream of the functionality of the TLB's of the MMU and is also downstream of the cache 14. That is, block 200 already assumes that virtual memory requests issued by the processor 10 have been translated into physical addresses by the MMU 12 so that either the ITLB 52 or UTLB 56 of the MMU can be used to obtain the physical memory requests corresponding to instructions or data respectively as shown in FIGS. 6 and 7 respectively. In an alternative embodiment, the processor does not use virtual addressing, in which case physical memory address requests are issued.

The physical memory addresses are then compared by the cache unit 14 to see whether they reside in the cache, i.e. cache hit. If they do reside in the cache unit, then there is no need to invoke the speculative control unit 202 since the memory addresses in the cache 14 are assumed to be valid as will be explained below.

As mentioned, the unfortunate property of speculative loads is that the compiler or programmer often has little or no control as to which memory addresses these type of instructions generate. That is, the memory address of speculative loads are often random and therefore it is necessary to have a mechanism, which prevents speculative loads from accessing sensitive memory areas. Examples of such sensitive areas may be peripheral devices that should not be accessed and/or areas which are read sensitive so that any load from such an area would change its state. The speculative load control unit is able to overcome these problems by checking the memory addresses of speculative loads before they access particular memory locations.

Also, these sensitive areas of memory are uncacheable memory addresses in that they should not and cannot be cached in the cache unit 14. Therefore, a distinction should be drawn between memory addresses which are uncacheable and cache misses. Cache misses are for memory addresses which are cacheable, but are not currently stored in the cache 14. That is, the cache has a finite number of entries and typically stores the most recent memory addresses.

FIG. 8 illustrates that the block 200 then prefetches the cache miss addresses and sends them respectively via the branches 206a to the SCU 202 and 206b to memory 16, 18. The cache miss addresses may either be addresses that are cacheable, but that are not currently stored in the cache 14 or addresses that are uncacheable. Although the lines 206a and 206b are shown to branch in parallel in FIG. 8, it should be appreciated that whereas preparatory steps can be taken to load the requested address from memory 16, 18; the actual memory address is not loaded until it has been validated by the SCU 202. If the address is found to be invalid by the SCU 202, then the requested access to memory 16, 18 is aborted along the horizontal line 208 and also a zero is returned along the vertical line 208 to block 200.

The SCU 202 receives the cache miss addresses along lines 206a and a prefetch bit along line 204 is set if the requested memory address corresponds to a speculative load. The SCU has a plurality of defined memory regions and checks whether the memory addresses lie within at least one of the valid memory regions. In this manner, the SCU prevents the system from searching for memory requests to devices that are not mapped. If the requested memory addresses does not lie within one of the defined regions that then memory address is invalid and the abort signals along lines 208 are issued.

In summary, there are various scenarios that may exist:

1. A Speculative Load to a Cached Address

This occurs for memory address currently stored in the cache, and hence which are cacheable. If the requested address is in the cache 14, then the corresponding data is returned immediately. This is the critical path. The SCU is not consulted in this case, because the fact that the address is in the cache implies that it has already passed the SCU test . That is, when the address was first brought into the cache, it would have been checked by the SCU if it was accessed speculatively for the first time, or alternatively it was accessed with a normal load the first time (in which case the SCU is ignored).

2. A Speculative Load to a Non-Cached Address

This may occur when either the memory address of a speculative load is uncacheable or if it is cacheable but not currently stored in the cache. If the requested address is not in the cache, then the SCU is consulted for a speculative load. If the SCU validates the memory address to speculate from, then the address is sent out to the bus, and the machine waits for the data to come back from memory. This is not on the critical path, because the time period for retrieving the data is much larger in terms of processor cycles. Alternatively, if the SCU finds that the address is not valid for speculation then a zero is returned. It should be noted that the zero just indicates that the speculative load is not valid, but the cache is not filled with a zero.

3. A Normal Load to a Cached Address.

Normal loads are filtered out by the block 200 and completely ignore the SCU.

4. A Normal Load to a Non-Cached Address.

These always ignore the SCU.

According to a preferred embodiment of the present invention, the SCU 202 supports four memory regions which are each defined in physical address space by registers containing a base and a limit physical address. It should be appreciated that the system designer could for example decide to have more or less memory regions depending on the system, for example which peripheral devices should be accessed. For example, each region is configured using the control registers SCU_BASEx and SCU_LIMITx shown below in tables 2 and 3.

TABLE 2

SCU_BASE_x bit fields

| Name | Bit(s) | Access (U/S) | RESET | Comment |
|---|---|---|---|---|
| ZERO | [12:0] | RO/RO | 0x0 | These bits are always zero |
| BASE | [31:13] | RO/RO | 0x1 | Bits [31:13] of the base of this region |

TABLE 3

SCU_LIMIT_x bit fields

| Name | Bit(s) | Access (U/S) | RESET | Comment |
|---|---|---|---|---|
| ZERO | [12:0] | RO/RO | 0x0 | These bits are always zero |
| BASE | [31:13] | RO/RO | 0x0 | Bits [31:12] of the limit of this region |

A region may be disabled by setting the base to be larger than the limit. According to one embodiment of the present invention, the regions are not prioritised and so overlapping regions are illegal and will have undefined results.

During compilation the code sequence to be executed identifies all speculative load operations, which are then prefetched and sent to the SCU unit as explained. In more detail, the memory addresses are sent along line 206a along with a prefetch bit along lines 204 to the SCU 202.

The speculative load addresses received by the SCU 202 are then each compared to the addresses stored in the relevant base and limit control registers, which define the valid memory regions. In this way, the SCU is able to offer finer grain control for large page sizes and validate the addresses of the speculative loads.

According to a preferred embodiment of the present invention the following prefetches to retrieve data from memory should be discarded:

A prefetch to an uncached page.
A prefetch to a page which does not have read permission.
A prefetch that misses the TLB when the PFT_NO_MAPPING_EN bit is not set in the processor status word PSW. That is, when this bit is not set, this indicates that prefetches which would cause a NO-MAPPING exception are discarded. On the other hand, when this bit is set this indicates that prefetches can cause NO_MAPPING exceptions.
A prefetch to a memory address of a speculative load that misses the cache and does not fall into one of the valid regions in the SCU 202.

According to an embodiment of the present invention, speculative loads are handled in the following way:

For speculative loads that would cause PROT_VIOLATION exceptions, return "0" if the SPECLOAD_TRAP_EN bit in the PSW is clear. If however, this bit is set then speculative loads will cause PROT_VIOLATION exceptions.
Speculative loads that miss the TLB's will cause a $NO_{13}$ MAPPING exception if the SPECLOAD_O_MAPPING_EN bit is set in the PSW. If however, this bit is clear then speculative loads that miss the TLB's will return "0" without causing an exception.
NO_MAPPING exceptions are handled differently for speculative loads than for normal loads. If a speculative load is to an address for which there is no mapping the handler creates a temporary (4 k) page with NA/NA permissions. That is, the created page cannot be read from or written to. The prefetched instructions bundle is then re-issued and a "zero" is returned. FIG. 8 illustrates this through the "speculative abort" signal, which indicates that the prefetched speculative load and its associated instruction bundle will need to be re-issued at a later stage. According to an embodiment of the present application, it is necessary to ensure that any temporary page entries are removed from the UTLB when new mappings are created.

Speculative loads that miss the cache are validated by the SCU 202 and if it does not fall into one of the memory regions defined by the SCU then a "0" is returned.

It should be appreciated that although it was described in a particular embodiment that one of the purposes of the TLB's within the MMU is to translate from a virtual address to a physical address, the present invention does not need to perform such a translation if the computer system uses physical addressing only.

It should be appreciated that although the term "circuitry" was used throughout the description, this term is intended to cover software. For example, the actual translation circuitry in the MMU could be implemented purely on a software level.

It should be appreciated that FIG. 8 was only a conceptual view of the functionality for the SCU 202, which could for example be located within the MMU itself 12 or elsewhere in the system.

It should be appreciated that devices are handled in the same way as RAM. So in a small real-time operating system the devices will be mapped with a large page, and in a large operating system they will more likely be faulted in, although they could be mapped with a large page.

Also, according to a preferred embodiment the number of regions defined in the SCU should be greater than or equal to the regions of RAM to be mapped. In an alternative embodiment, the compiler can be instructed not to use speculative loads for the instructions accessing the RAM.

It should also be understood that the UTLB and ITLB of the described embodiments are non-limiting and the present invention could be applied equally well to an MMU having a dedicated DTLB (Data Translation Look-aside Buffer) as well. Also, it should be appreciated that the register configuration is flexible. It is intended that the present invention encompass such changes and modifications as fall within the scope of the appended claims.

What is claimed is:

1. A computer system having:
    a physical processor operable to issue memory access requests to a memory address space;
    a memory map for addressing a plurality of selectively available memory mapped devices, using a page for each memory map device;
    translation circuitry for translating virtual memory addresses into physical memory addresses, wherein the memory map is divided into virtual pages mapped to corresponding physical addresses, the pages having a page size greater than the memory space occupied by at least one of said memory mapped devices; and
    a memory access system for accessing said memory mapped devices when available, the memory access system having:
    an input for receiving a physical memory address from said physical processor;
    means for defining a plurality of valid memory regions covering a memory space within which there exists at least one of said available memory mapped devices; means for checking whether the received physical memory address lies in at least one of the defined memory regions, whereby if it does, the address is validated for access, and if it does not, an error is returned;
a prefetching unit for identifying received physical memory addresses corresponding to speculative load operations directed to the at least one memory mapped device occupying memory space smaller than the page size; and
means for checking whether the received physical memory address of one of said speculative load operations lies in at least one of the defined memory regions, whereby if it does, the address is validated for access, and if it does not, an error is returned.

2. The computer system of claim 1, wherein the virtual pages are of a fixed page size.

3. The computer system of claim 1, wherein if the received memory address does not lie within one of the defined memory regions then a zero is returned and the memory access to that memory address is aborted.

4. The computer system of claim 1, wherein each valid memory region is defined as a range of physical memory addresses between base and limit memory addresses.

5. The computer system of claim 1, wherein four valid memory regions are defined.

6. The computer system of claim 1, comprising a first translation look-aside buffer for translating memory addresses corresponding to instructions, and a second translation look-aside buffer for translating memory addresses corresponding to both instructions and data.

7. A method for validating a memory address in a computer system having:
a memory map for addressing a plurality of selectively available memory mapped devices using a page for each memory map device;
translation circuitry for translating virtual memory addresses into physical memory addresses, wherein the memory map is divided into virtual pages mapped to corresponding physical addresses, said page size being greater than the memory space occupied by at least one of said memory mapped devices; and
a memory access system for accessing said memory mapped devices when available, the method comprising:
defining a plurality of valid memory regions covering a memory space within which there exists at least one of said available memory mapped devices;
receiving a physical memory address;
determining whether said physical memory address corresponds to a speculative load operation directed to the at least one memory mapped device occupying memory space smaller than the page size; and
checking whether the received physical memory address of one of said speculative load operations lies within at least one of the defined memory regions, whereby if it does, the address is validated for access, and if it does not, an error is returned.

8. A computer system comprising: a physical processor operable to issue memory access requests to a memory address space;
translation circuitry for translating virtual memory addresses into physical memory addresses, wherein a memory map is divided into virtual pages mapped to corresponding physical addresses, using a page for each memory mapped device, the pages having a page size greater than the memory space occupied by at least one of said memory mapped devices; and
filtering means for identifying which of said memory access requests correspond to a speculative load operation directed to the at least one memory mapped device occupying memory space smaller than the page size; and
a control unit comprising:
an input for receiving said memory access requests from said physical processor;
means for defining a plurality of valid memory regions covering a memory space within which there exists at least one of said available memory mapped devices; and
means for checking that each physical memory address of the received requests lies in at least one of the defined memory regions, whereby if it does, the address is validated for access, and if it does not, an error is returned.

9. A computer system having a memory map useable to address a plurality of selectively available memory mapped devices, using a page for each memory map device;
a physical processor operable to issue memory access requests to a memory address space;
translation circuitry for translating virtual memory addresses into physical memory addresses, wherein the memory map is divided into a virtual pages mapped to corresponding physical addresses, the pages having a page size greater than the memory space occupied by at least one of said memory mapped devices; and
a memory access system for accessing said memory mapped devices when available, the memory access system having:
an input for receiving a physical memory address from said physical processor;
circuitry adapted to define a plurality of valid memory regions covering a memory space within which there exists at least one of said available memory mapped devices;
circuitry adapted to check whether the received physical memory address of a speculative load operation directed to the at least one memory mapped device occupying memory space smaller than the page size lies in at least one of the defined memory regions, whereby if it does, the address is validated for access, and if it does not, an error is returned; and
circuitry adapted to indicate to the checking circuitry whether the received physical memory address is for said speculative load operation.

10. A computer system having:
a physical processor operable to issue memory access requests to a memory address space;
a memory map useable to address a plurality of selectively available memory mapped devices, using a page for each memory map device;
translation circuitry for translating virtual memory addresses into physical memory addresses, wherein the memory map is divided into a virtual pages mapped to corresponding physical addresses, the pages having a page size greater than the memory space occupied by at least one of said memory mapped devices; and
a memory access system for accessing said memory mapped devices when available, the memory access system having:
an input for receiving a physical memory address from said physical processor;
circuitry adapted to define a plurality of valid memory regions covering a memory space within which there exists at least one of said available memory mapped devices;

circuitry adapted to check whether the received physical memory address of a speculative load operation directed to the at least one memory mapped device occupying memory space smaller than the page size lies in at least one of the defined memory regions, whereby if it does, the address is validated for access, and if it does not, an error is returned; and circuitry adapted to ensure that the checking circuitry only checks the physical memory address if it is for said speculative load operation.

11. A computer system having a memory map useable to address a plurality of selectively available memory mapped devices;

a physical processor operable to issue memory access requests to a memory address space;

translation circuitry for translating virtual memory addresses into physical memory addresses, wherein the memory map is divided into a virtual pages mapped to corresponding physical addresses using a page for each memory map device, the pages having a page size greater than the memory space occupied by at least one of said memory mapped devices; and a memory access system for accessing said memory mapped devices when available, the memory access system having:

an input for receiving a physical memory address from said physical processor;

a cache configured to hold data entries;

circuitry adapted to identify a cache miss when the received physical memory address does not correspond to any of the data entries in the cache;

circuitry adapted to define a plurality of valid memory regions covering a memory space within which there exists at least one of said available memory mapped devices;

a prefetching unit for identifying received physical memory addresses corresponding to speculative load operations directed to the at least one memory mapped device occupying memory space smaller than the page size; and circuitry adapted to check whether the received physical memory address of one of said speculative load operations lies in at least one of the defined memory regions for a cache miss, whereby if it does, the address is validated for access, and if it does not, an error is returned.

12. A computer system having a memory map useable to address a plurality of selectively available memory mapped devices;

a physical processor operable to issue memory access requests to a memory address space;

translation circuitry for translating virtual memory addresses into physical memory addresses, wherein the memory map is divided into a virtual pages mapped to corresponding physical addresses, using a page for each memory map device, the pages having a page size greater than the memory space occupied by at least one of said memory mapped devices; and a memory access system for accessing said memory mapped devices, when available, the memory access system having:

an input for receiving a physical memory address from said physical processor;

circuitry adapted to define a plurality of valid memory regions covering a memory space within which there exists at least one of said available memory mapped devices;

a prefetching unit for identifying received physical memory addresses corresponding to speculative load operations directed to the at least one memory mapped device occupying memory space smaller than the page size; and circuitry adapted to check whether the received physical memory address of one of said speculative load operations lies in at least one of the defined memory regions, whereby if it does, the address is validated for access, and if it does not, the memory address is invalid and the memory access is aborted.

13. A computer system having a memory map useable to address a plurality of selectively available memory mapped devices;

a physical processor operable to issue memory access requests to a memory address space;

translation circuitry for translating virtual memory addresses into physical memory addresses, wherein the memory map is divided into a virtual pages mapped to corresponding physical addresses, using a page for each memory map device, the pages having a page size greater than the memory space occupied by at least one of said memory mapped devices; and a memory access system for accessing said memory mapped devices when available, the memory access system having:

an input for receiving a physical memory address from said physical processor;

a cache configured to hold data entries;

circuitry adapted to identify a cache miss when the received physical memory address does not correspond to any of the data entries in the cache;

circuitry adapted to define a plurality of valid physical memory regions covering a memory space within which there exists at least one of said available memory mapped devices;

circuitry adapted to check whether the received physical memory address of a speculative load operation lies in at least one of the defined memory regions for a cache miss, whereby if it does, the address is validated for access, and if it does not, the memory address is invalid and the memory access is aborted;

circuitry adapted to indicate to the checking circuitry whether the received physical memory address is for said speculative load operation directed to the at least one memory mapped device occupying memory space smaller than the page size; and circuitry adapted to ensure that the checking circuitry only checks the physical memory address if it is for said speculative load operation.

* * * * *